Jan. 11, 1966 J. G. C. KOKKE 3,229,044

ADJUSTMENT OF MAGNETIC HEADS

Filed Oct. 12, 1960

INVENTOR
JOHANNES G.C. KOKKE

BY Frank R. Trifari
AGENT

United States Patent Office 3,229,044
Patented Jan. 11, 1966

3,229,044

ADJUSTMENT OF MAGNETIC HEADS

Johannes Gerardus Canisius Kokke, Eindhoven, Netherlands, assignor to North American Philips Company, Inc., New York, N.Y., a corporation of Delaware Filed Oct. 12, 1960, Ser. No. 62,174
Claims priority, application Netherlands, Nov. 24, 1959, 245,729
3 Claims. (Cl. 179—100.2)

The invention relates to a device for adjusting the position of the air gap of a magnetic head used for recording or reproducing magnetic records, in which the head is fastened to a supporting body, and is adapted to rotate about a shaft which is supported by the frame and arranged at right angles to the contact surface between the head and the tape; the rotating action is achieved by means of a screw adjusted against the action of a spring.

In a known embodiment of a device of this kind the frame supports the shaft with the interposition of a mounting plate which is connected to the frame by means of three adjustable contact points. This permits adjustment of the head in the direction of the width of the tape and also movement of the contact surface of the head into the correct position relative to the plane of the tape. However, by adjusting the mounting plate, the rotating adjustment of the head about the shaft may be affected, since the three contact points are separately adjustable.

In accordance with the present invention the shaft is journalled in elongated slots in the supporting body or the frame, the slots extending in the direction of the gap; each end of the shaft can be adjusted by a separate screw in the supporting body or the frame against the spring action.

The invention provides a simple and compact structure, which permits the turning of the head about the shaft subsequent to both the adjustment of the head in the direction of tape width and in the relation of the head contact surface with the tape surface; the two latter adjustments are not affected by the former. Moreover, with the adjustment according to the invention, the spring provided for the adjustment about the shaft is also utilized for adjusting the lateral shaft position. This structure permits the correction of all tolerances of the head, the shape and the dimensions.

The invention will be described more fully with reference to one embodiment as shown in the accompanying drawings, wherein.

Figure 1:
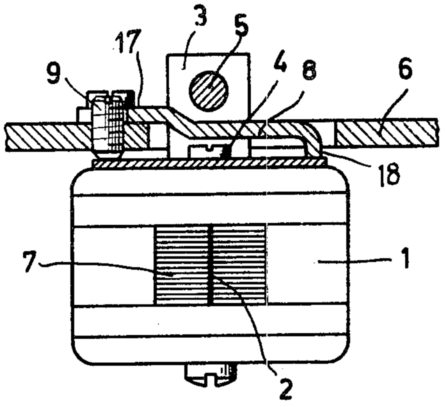
FIGURE 1 is an elevation of the contact surface of the head.
Figure 2:
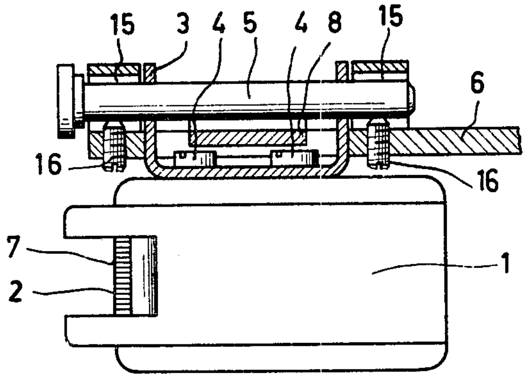
FIGURE 2 is a side view of the head shown in FIGURE 1.

A magnetic head 1 shown in FIGURES 1 and 2 comprises an air gap 2 and is fastened to a supporting body having the form of a U-shaped bracket 3 by means of bolts 4. Each of the legs of the U-shaped bracket 3 has a bore into which a shaft 5 is inserted, which is supported by a plate 6 of the frame. The shaft 5 is at right angles to the surface 7 of the head, with which the tape (not shown) is to be brought into contact. A blade spring 8 has one end 17 fastened to the plate 6, the other end 18 of this spring engaging the magnetic head 1, so that the magnetic head 1 as shown in FIGURE 1 tends to turn in a clockwise direction. A set screw 9 contacting the head 1 is provided in plate 6 by means of which the turn of the head 1 about the shaft 5 can be adjusted against the effect of the blade spring 8. With the combined effect of the blade spring 8 and the set screw 9 any play between the shaft 5 and its bearings in the U-shaped bracket 3 and the plate 6 cannot produce variations in the position of the head 1.

The shaft 5 is journalled at its ends in elongated slots 15 of the plate 6. These elongated slots extend in the direction of the air gap 2. Adjusting screws 16 are provided in plate 6 with the ends of the screws located in the elongated slots 15. The blade spring 8 holds the shaft 5 at each end on one of the adjusting screws 16.

Consequently, the head can be turned about the shaft 5 by means of set screw 9, so that the direction of the air gap 2 can be adjusted, while by means of the adjusting screws 16 the position and the direction of the shaft 5 are adjustable. The turning or rotation of the head by means of the set screw 9 does not affect any adjustments made with the adjustment screws 16.

What is claimed is:

1. A device for adjusting the gap position of a magnetic head, comprising: a supporting body, means for fastening the head to the supporting body, a stationary frame element having elongated slots therein, a shaft passing through said supporting body and said elongated slots in a direction at right angles to the front surface of the head, a spring bearing against said frame element and urged against one portion of said head on one side of said shaft with the interposition of a set screw which passes through said frame element and has its end contacting another portion of said head on the other side of said shaft, said head being biased to rotate about said shaft under the urging of said spring while the spring urges said shaft in said elongated slots towards a plurality of adjusting screws passing through said frame element with ends contacting said shaft, the adjustment of the set screw rotating the head about the shaft, and the adjustment of the adjusting screws changing the relative lateral positions of the head and the frame.

2. A device for adjusting the gap position of a magnetic head, comprising: a supporting body, means for fastening the head to the supporting body, a stationary frame element having elongated slots therein, a shaft passing through said supporting body and said elongated slots in a direction at right angles to the front surface of the head, a spring bearing against said frame element and urged against one portion of said head on one side of said shaft with the interposition of a set screw which passes through said frame element and has its end contacting another portion of said head on the other side of said shaft, said head being biased to rotate about said shaft under the urging of said spring while the spring urges said shaft in said elongated slots towards at least one adjusting screw passing through said frame element and contacting said shaft, the adjustment of the set screw rotating the head about the shaft, and the adjustment of the adjusting screws changing the relative lateral positions of the head and the frame.

3. A device for adjusting the gap position of a magnetic head including a front surface having the exposed gap, comprising: a supporting body, means for fastening the head to the supporting body, a stationary frame element having elongated slots therein, a shaft passing through said supporting body and said elongated slots, said shaft being at right angles to the front surface and said slots extending in the direction of the gap, a spring bearing against said frame element and urged against one portion of said head on one side of said shaft with the interposition of a set screw which passes through said frame element and has its end contacting another portion of said head on the other side of said shaft, said head being biased to rotate about said shaft under the urging of said spring while the spring urges said shaft in said elongated slots towards at least one adjusting screw passing through said frame element and contacting said shaft, the adjustment of the set screw rotating the head about the shaft, and the adjustment of the adjusting screws changing the relative lateral positions of the head and the frame.

References Cited by the Examiner

UNITED STATES PATENTS

| | | | |
|---|---|---|---|
| 2,560,569 | 7/1951 | Hare | 179—100.2 |
| 2,658,951 | 11/1953 | Albee et al. | 179—100.2 |
| 2,840,380 | 6/1958 | Camras. | |

BERNARD KONICK, *Primary Examiner.*

NEWTON N. LOVEWELL, IRVING L. SRAGOW, *Examiners.*